(No Model.)

5 Sheets—Sheet 1.

N. B. FASSETT.
MACHINE FOR TRIMMING AND COUPLING CHAIN LINKS.

No. 347,338. Patented Aug. 17, 1886.

Witnesses
Wm. Snider
L. L. Miller

Inventor
Nelson B. Fassett
By his Attorney Chas. H. Fowler (No Model.) 5 Sheets—Sheet 3.

N. B. FASSETT.
MACHINE FOR TRIMMING AND COUPLING CHAIN LINKS.

No. 347,338. Patented Aug. 17, 1886.

Witnesses
Wm. Braiden
L. L. Miller

Inventor
Nelson B. Fassett.
By his Attorney
Chas. H. Fowler (No Model.)

N. B. FASSETT.
MACHINE FOR TRIMMING AND COUPLING CHAIN LINKS.

No. 347,338. Patented Aug. 17, 1886.

5 Sheets—Sheet 4.

Witnesses

Inventor
Nelson B. Fassett,
By his Attorney
Chas. H. Fowler (No Model.)  5 Sheets—Sheet 5.
N. B. FASSETT.
MACHINE FOR TRIMMING AND COUPLING CHAIN LINKS.
No. 347,338. Patented Aug. 17, 1886.
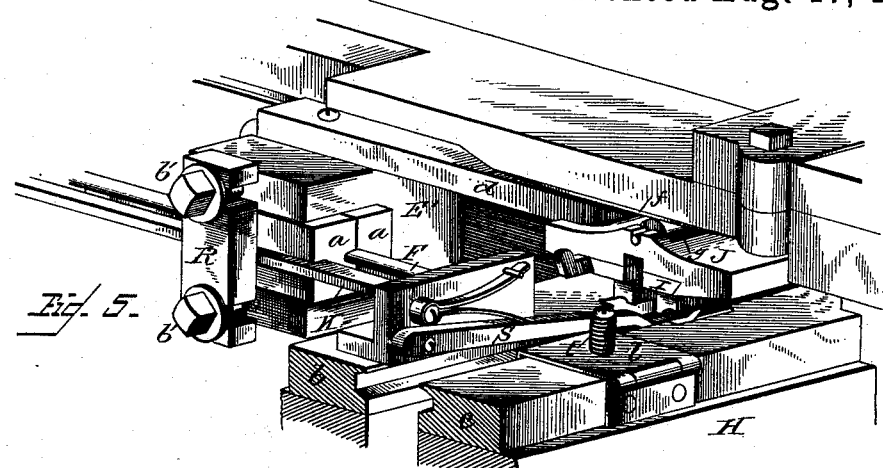
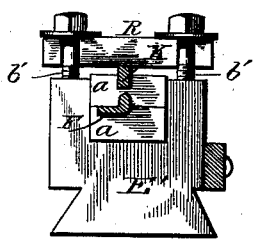
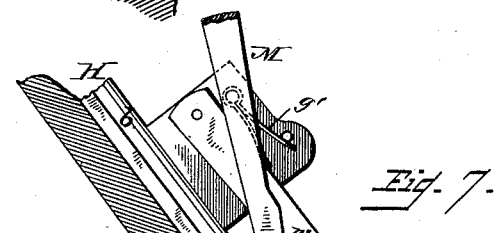
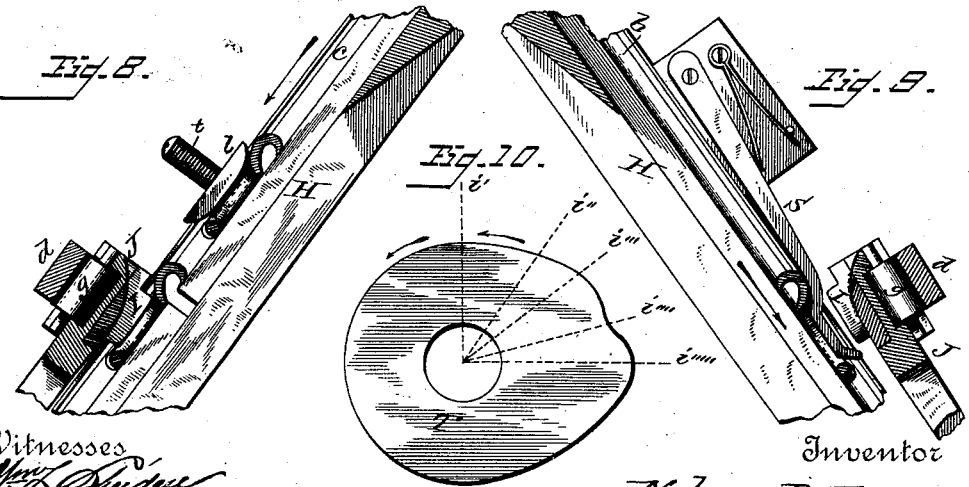
Witnesses
Inventor
Nelson B. Fassett
By his Attorney
Chas. H. Fowler

UNITED STATES PATENT OFFICE.

NELSON B. FASSETT, OF MOLINE, ILLINOIS.

MACHINE FOR TRIMMING AND COUPLING CHAIN-LINKS.

SPECIFICATION forming part of Letters Patent No. 347,338, dated August 17, 1886.

Application filed August 21, 1885. Serial No. 174,961. (No model.)

*To all whom it may concern:*

Be it known that I, NELSON B. FASSETT, residing at Moline, in the county of Rock Island and State of Illinois, and a citizen of the United States, have invented a new and useful Improvement in Machines for Trimming, Drifting, and Coupling Chain-Links, of which the following is a full description, reference being had to the accompanying drawings.

Figure 1:
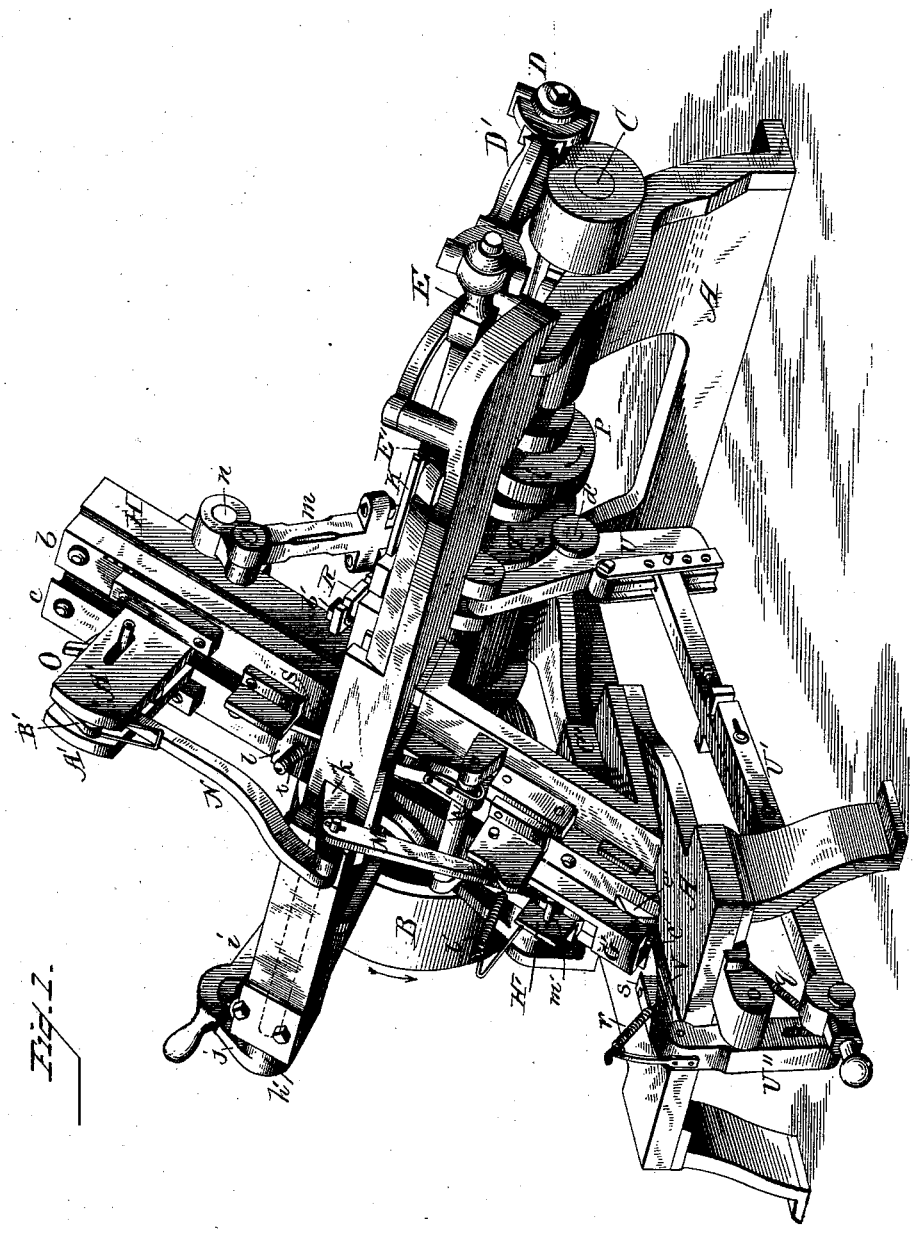
Figure 2:
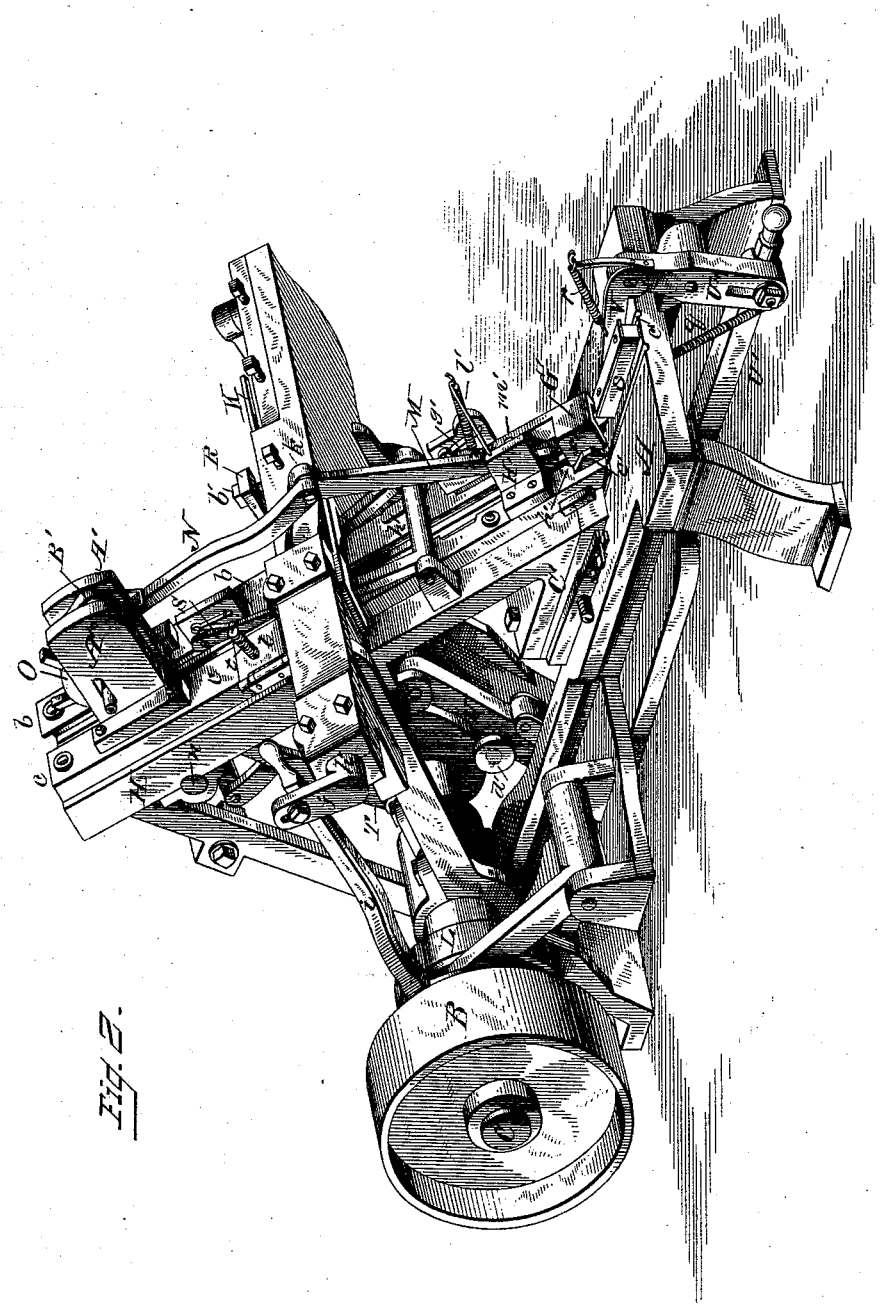
Figure 3:
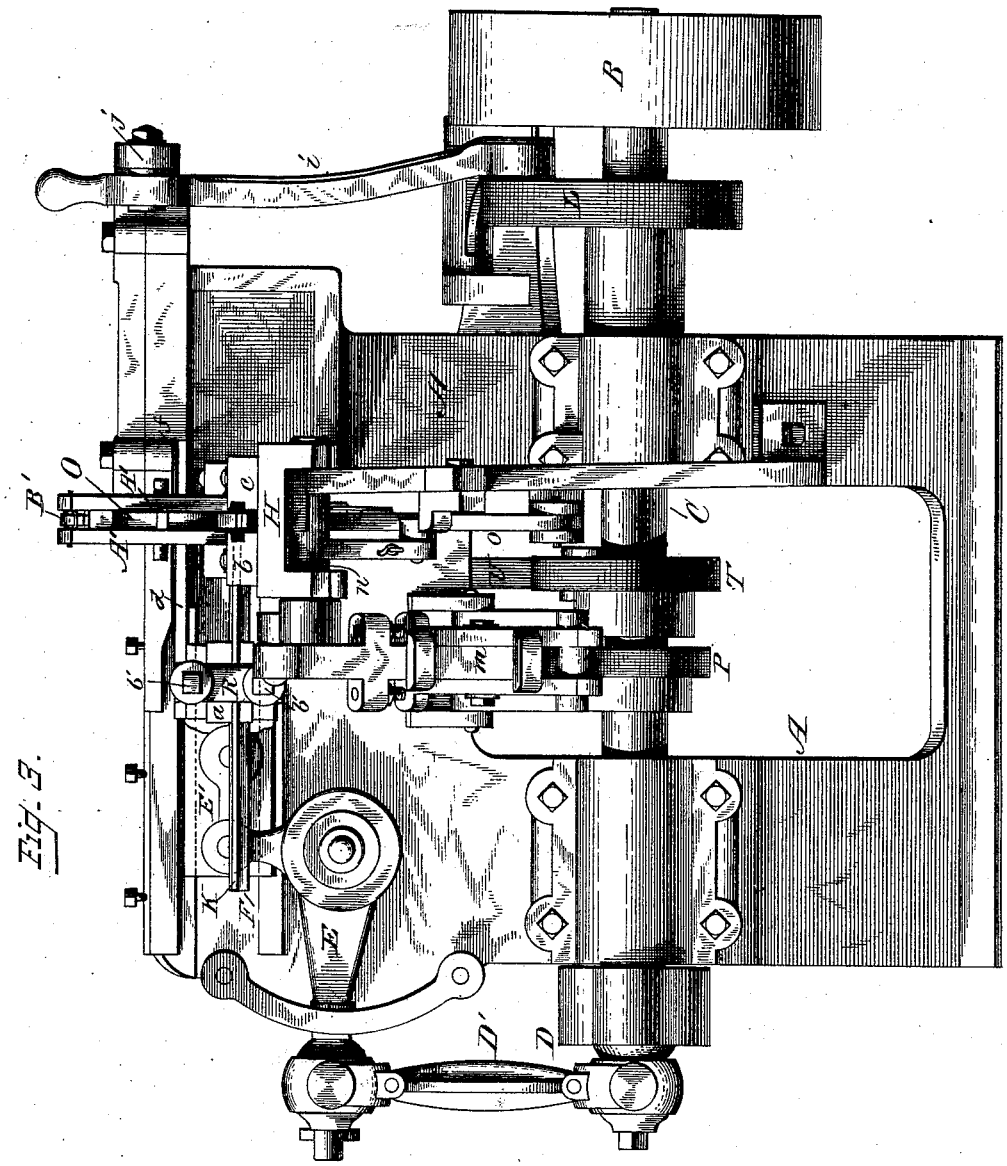
Figure 4:
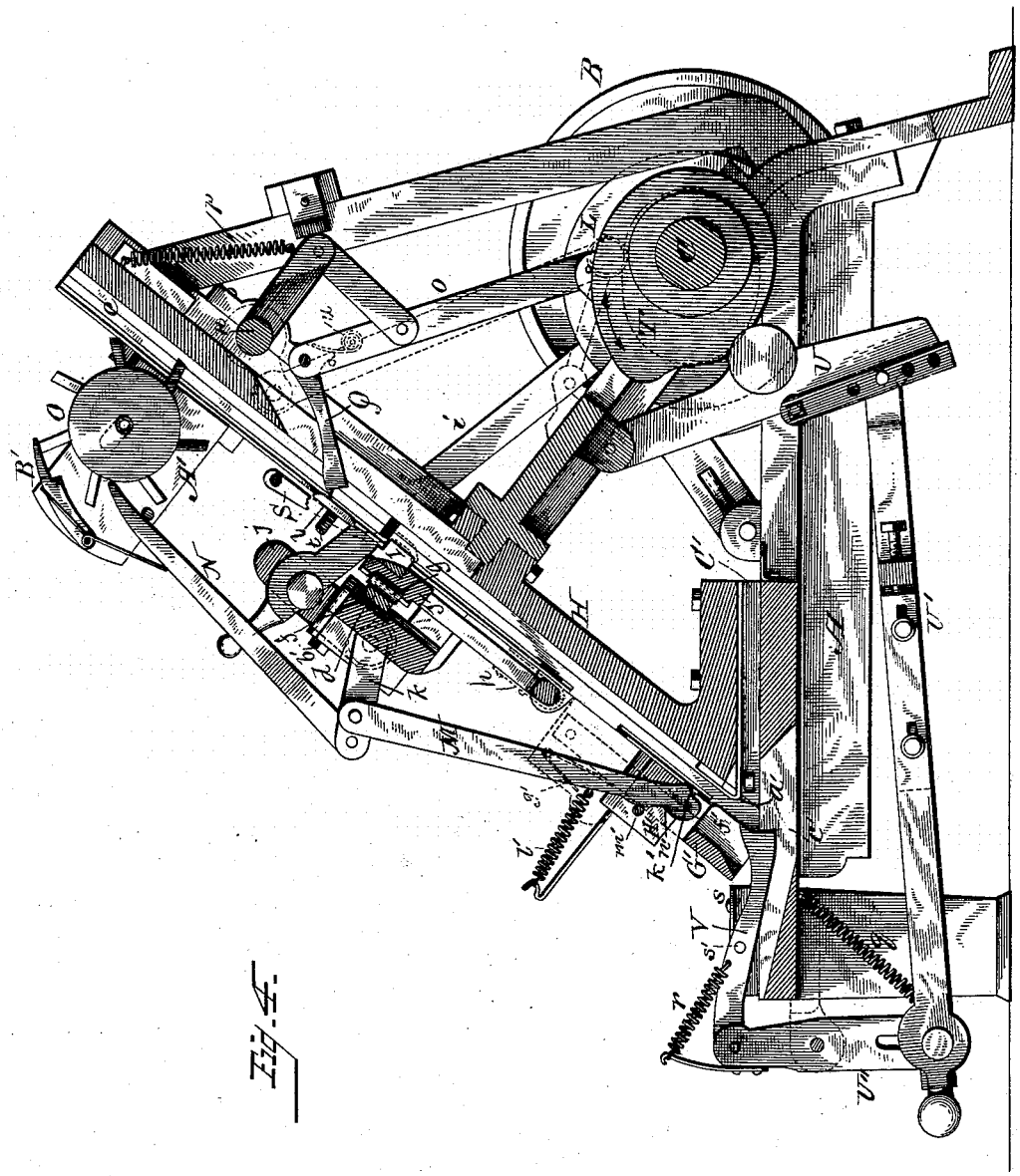

Figure 1 of the drawings is a perspective view of the machine; Fig. 2, a similar view taken from the side opposite to that of Fig. 1; Fig. 3, a rear end view of the machine; Fig. 4, a vertical section thereof; Fig. 5, a detail view in perspective and on an enlarged scale showing the clamping device, spring friction-latch, and the carriage with the trimmer and the drift device connected thereto; Fig. 6, an end view of the carriage and its attachments; Fig. 7, a detail sectional view of the lower end of the chute and chain channel or guideway, the link-coupling device and thrust-bar being shown in position, and also the links in position for coupling; Fig. 8, a detail sectional perspective view of the link-channel of the chute, showing the links held in position by the clamp device and the spring-latch; Fig. 9, a detail view showing the check-bar in position under the clamp device and on the link, and Fig. 10 a plan view of the variable cam.

The present invention has for its object to provide a machine capable of accomplishing automatically the labor which, previous to my invention, was performed by hand manipulation—namely, that of uniting or coupling together the integral parts or links of detachable drive-chains to form a chain, and at the same time dress such links previous to uniting or coupling them, by removing any and all surplus material that may remain upon the hook of the links in consequence of the sprues not having broken off sufficiently close to the link, thus trimming them to uniform caliper from inside surface of hook; also, for taking off smoothly the ragged or feathered extremity of the hook or any other irregularity, and for bringing all hooks to the standard size and shape by thrusting a drift through them; also, for correcting to pattern any spring warp or twist that may occur during the process of annealing, thereby supplying a long-felt need of a machine that may be run by steam or other motive power by means of which the cost of production of certain sizes and forms of drive-chains may be materially lessened, greater accuracy attained, and a far more rapid rate of production secured than heretofore.

In the accompanying drawings, A represents the main frame of the machine, and B the driving wheel or pulley, carrying the main shaft C with its crank D and pitman D'. An oscillating elbow, E, drives a reciprocating-tool slide or carriage, E', to which it is pivotally connected, said carriage being adapted to receive the drift device F and sprue-trimmer, K, the former of which is suitably clamped between the faces of two parallel blocks, a, shaped to fit the opposite sides of the drift device, so as to hold it in place, as shown in Fig. 6. The sprue-trimmer is seated in a groove in the upper one of the blocks a, and rests under the tool-holder R, all of which are clamped tightly together by the screws b' or other convenient means.

When the main shaft C is revolved, the carriage E' will have imparted to it, by means of the crank-and-pitman connection D D', respectively, and the elbow E'', a reciprocating movement, and with it the trimmer K and drift device F, which pass through a transverse opening in the guide-bars b c of the feed-chute H. The drift device F passes through the transverse opening, as above stated, and as it comes in contact with the link, sizes or clears the hook thereof (sizing it only when too small) while the trimmer K removes any surplus matter of the sprue.

The projecting flange on the drift device F, as shown in Fig. 6, shaves and smooths off all irregularities, fins, or ragged projections at the end of the hook to the required length, to let the cross-bar of the entering link readily couple therewith.

The drift device may be of any desirable shape to adapt itself to the form and style of link to be operated upon, and the one shown may be replaced by a drift especially adapted to the Ewart link, and in shape to conform to that of the interior of the hook of such links. While the link is being thus operated upon it is held firmly in position by the clamp I, which is pressed down upon the side bars of the link by means of an actuating device, consisting, preferably, of a wedge, $d$, connected to the tool-carriage E', whereby it has imparted to it a transverse reciprocatory movement. This wedge is forced in between a spring, $f$, and friction-roller $g$, the former being connected to the frame of the machine, and the latter to the upper side of a pivoted clamp-holder, J, which may be of any desirable form and construction.

The main shaft C of the machine is provided with a suitable cam, L, by the revolution of which a rocking motion is imparted to the shaft $h'$ through the medium of the connecting bar $i$ and grooved or slotted crank $j$. At the opposite end of the shaft $h'$ is a crank, $k$, which dictates the time and motion of a link-coupling device, M, and a push-bar, N. The coupling device is employed to force a coupling of the links together at the lower end of the feeding-chute or link-guide H, and the push-bar periodically turns the sprocket or delivery-wheel O. I prefer to term this wheel a "delivery wheel or device," and it may be variously modified so long as the object to be attained is accomplished—viz., that of forcing the links down the channel of the feeding-chute should they stick, or from any cause hesitate to descend by gravity, and delivering them to a suitable friction latch, $l$.

The delivery wheel or device O, in the present case has its bearings in suitable brackets, A', its journals extending through elongated slots in the sides of said brackets to admit of the wheel yielding upwardly, when found desirable. A spring-pawl, B', of any suitable form, is pivoted between the brackets A' to prevent the wheel or delivery device O from turning in the wrong direction, as shown in Fig. 4.

A cam, P, on the main shaft C, imparts a timed movement up and down to the adjustable connecting-rod $m$, and this in turn oscillates the double-crank shaft $n$, which imparts a forward and backward movement to the pivoted lever $o$. To the upper end of the lever $o$ is pivoted the link-feeder Q, which is carried along nearly horizontally back and forth in the feeding-chute H, the outer or free end of the feeder hooking on or engaging with the lower cross-bar of the link, which is located under the spring-latch $l$. The feeder Q in its forward movement forces the link down obliquely in the link-channel of the chute H to a point directly under the clamp I, and there leaves it, it being caught and held in this position by the curved end of the check-bar S, wedging in between the two end bars of the link, as shown in Fig. 9. The return motion of the link-feeder Q is imparted by the coil or other form of spring, $p$, in time for feeding down the next link in the series. The cam T, on the main shaft C, imparts a timed movement to the lever U, the variable chain-bar U', and the adjustable lever U'', and, lastly, to the thrust-bar V, the motion being returned to the cam by the spring $q$, and the thrust-bar kept up to its work by a spring, $r$, while a pin, $s'$, projecting from one side of the thrust-bar under the flange on the stop $s$ prevents the thrust-bar from being lifted too high by the spring which is attached thereto. In this manner a timed and intermittent movement of the chain in its channel or guideway is kept up, the object thereof being to push the chain ahead the space of one link at every revolution of the main shaft.

As the first link is introduced into the link-channel of the chute by the hand of the attendant, the link slides down the channel until the back of the hook strikes the friction spring-latch $l$, where it is arrested by the flanged end of the latch being pressed down upon it by the action of the coiled spring $t$, said link being arrested far enough above the link under clamp to allow the sprue-trimmer K to pass through and trim said link under clamp, as shown in Fig. 8. By this means the first link supplied to the machine is arrested on its downward passage and the succeeding links are stopped by this first link, and so on until the link-channel of the chute above the stop is supplied with the separate links. While the first link is thus resting under the spring-latch $l$, the machine is set in motion.

The friction spring-latch I prefer terming an "arresting device," as the form of device shown is one of many forms that may be employed to arrest the descent of the link in the channel of the chute, for the purpose hereinbefore stated. Starting with one link resting under the arresting device $l$, and the link-feeder Q still hooked upon the lower cross-bar of the link, one of the first moves made by the revolving of the main shaft C and cam P is responded to by the spring $p$ drawing the link-feeder backward out of the way, and the spring $u$ (shown in dotted lines, Fig. 4) throwing the outer end of the feeder up, so that the hooked end thereof may engage the cross-bar of the next link above, now under the arresting device $l$, and be in readiness to bring this link down at the proper time. Continuing the rotary motion of the shaft C, the crank D, pitman D', and elbow E produce a forward movement of the tool-carriage E', which carries the drift device F and sprue-trimmer K horizontally through and past the hook of the link, respectively, the link when thus operated upon to dress it being under the clamp I, and held thereby. Upon the return movement of the drift device and trimmer, after the link has been drifted and trimmed, or, in other words, dressed, the link is released from the clamp by the withdrawal of the wedge or actuating device $d$, and afterward slides down to the lower end or bottom of the link-channel of the chute H. If this should be the first link down in the link-channel of the chute, it would be preferable to stay the action of the thrust-bar V for a few moments, and let the lower link-channel partially fill with accumulated links. This is done by simply pressing the thrust-bar V down with the thumb, so as to let it thrust under the link at the bottom of the link-channel a few times, when, by removing the thumb, the thrust-bar will seize the lower cross-bar of the link lowermost in the link-channel, and push the lower end of the link endwise into the chain channel or guideway C', the fulcrum-corner $a'$ forcing the upper end of the link over and downward until the link assumes a horizontal position at the entrance of the chain channel or guideway.

That portion of the main frame at the juncture of the lower end of the chute H and the chain channel or guideway C' has a narrow slot, $c'$, of just sufficient width to allow the thrust-bar V to freely play therein, and not to interfere with the link when assuming a horizontal position after leaving the channel of the chute.

By the continued revolution of the main shaft the process of successively coupling or uniting the links together is effected, the spring $q$ returning the motion of the cam T on the main shaft, the initial force being imparted by said cam to a friction-roller, $d'$, suitably connected to the pivoted lever U, as shown in Figs. 1 and 2.

After the first link is deposited longitudinally in the chain channel or guideway C', the next in the link-channel of the chute H slides down until it reaches the mouth of the hook of the previous link now in the chain-channel. A spring-guide, G', operates between the side walls, $e'$, at the lower end of the chute H, the two bottom edges, $f'$, of the guide resting on the side bars of the link astride the hook, and said guide is held down by the spring $g'$. By means of the two side walls, $e'$, the links cannot become displaced sidewise, these walls forming, as it were, a continuation of the side guides of the link-channel, and being built up considerably higher than the depth of said channel, and by the employment of the spring, the links cannot get out of place laterally or ride or slip over onto each other, but retain their places in the link-channel always in a straight line.

At the point where the spring-guide G' rests down upon the side bars of the link, the inner sides or edges of the guide-bars $b\ c$ of the chute are cut away, as shown at $h'$, Fig. 2, to let the guide G' down onto the side bars, and also to let the link turn over the fulcrum corner $a'$, when fed along by the thrust-bar V. As the link is thrown over and down by the thrust-bar V around the fulcrum-corner $a'$, the spring $g'$ yields for that purpose and returns in time to direct the next link down. The variable cam T on the main shaft, turning in the direction of the arrow, is adjustable on the shaft by a set-screw, so that by its irregular periphery, as shown in Fig. 10, it operates the thrust-bar V at the right time and distance. As the variable cam T turns, it first brings the point $i'$ against the friction-roller $d'$ of the lever U, then still turns until the point $i''$ upon the periphery is reached, which by the system of levers, bars, and connections, has caused the thrust-bar V to advance as far as the position shown in Fig. 4. Leaving $i''$, the cam in its movement brings the point $i'''$ in contact with the roller $d'$ at the moment the link-coupling device M forces the lowermost link in the link-channel downward into union with the link in the chain channel or guideway C'. This downward movement of the link and a slight simultaneous forward movement of the horizontal link cause the two links to come together much easier than if the horizontal link were held stationary at the time of coupling. While the cam T is turned over to the point $i''''$, the force-bar or coupling-device M withdraws, so as not to interfere with the action of the cam moving up to $i'''''$, which causes the thrust-bar V to push the chain along a distance of one link. From $i'''''$ onward around to the starting-point—viz., $i'$—the spring $q$ causes the thrust-bar to draw back and into position ready to repeat for the next link.

The hooked end of the force-bar or coupling device M is curved or hollowed out at the lower corner, as shown at $k'$, Fig. 7, so as to not slip off the hook of the link, the spring $l'$ keeping the bar up against the stop $m'$, which stop is rigidly sustained by a bracket, H', bolted firmly to the main frame of the machine. The upper side of the lower end of the coupling device M is further shaped by double inclined surfaces, as shown at $n'$, so as to allow it to rise on its backward stroke high enough to permit the links to slide down under it; but when thrust downward, the lower inclined surface, first striking the stop $m'$, causes the lower corner to immediately drive down into the link-channel and engage the hook of the link lowermost in the link-channel and force the coupling.
The cam P imparts a regular intermittent movement to the adjustable rod $m$, which rod is made adjustable in length by a set-screw, or in any other well-known manner, so as to give the link-feeder Q the exact amount of travel required in order to leave the links directly under the clamp I. The chain-bar U' is also made adjustable longitudinally by set-screws or by other convenient means, so as to impart the required throw to the thrust-bar V to accommodate it to the different lengths of links, and the force-bar or coupling device M in like manner is adjustable by the slotted crank $j$, as shown in Fig. 2, which also adjusts the throw of the push-bar N.

The guideways or bars $b\ c$ can be moved from or toward each other, to adapt the channel to the different widths of links, this being attained by set-screws passing through elongated slots in the guideways or bars, or in any well-known manner.

The fulcrum corner or plate $a'$ consists of a steel plate hardened, as I have found that by constant use iron will not last any length of time, this plate being secured to the guide-bars of the chute, and its office is, as hereinbefore stated, to throw the link over and down to a horizontal position as the chain is moved along by the thrust-bar V.

The machine as herein described is susceptible of modifications in the various details of construction without departing from the principle and purpose of the invention or the mode of operation. The essential feature thereof is combining with a machine for putting together the links of a drive-chain of a means for dressing the individual links previous to their being coupled or put together, irrespective of the exact form of devices employed for this purpose; further, to provide means consisting of a clamping device, whereby each link in turn is received automatically and clamped or held firmly, and a trimming device for removing any superfluous projections from the exterior of the hook, caused by the sprue not having broken off sufficiently close to the hook, the links shall be properly dressed by being trimmed of their sprues or other projections; also, the invention has for one of its main features devices of which their combined offices shall consist in a trimming device for dressing the overhanging end of the hook of the individual links of a drive-chain to any required degree that will ease or facilitate the coupling of said links together, and in a drift or sizing bar adapted to be thrust through the hooks of the several links, in order to size, shape, or correct them to a uniform standard, or to clean said hooks and rid them of any sand or dirt, or of any irregularities of the inside surface, should any exist.

The feed-chute, guideway, and means for pushing the assembled links forward therein, a delivery wheel or device, the fulcrum plate or corner, operating mechanism, and such details of construction not herein broadly claimed, form the subject of a separate application, Serial No. 174,962.

It will be noticed that the chain guide or channel is located directly under the link-channel, on the same vertical plane therewith, instead of to one side, this being one of the essential features of my invention to adapt the machine in coupling certain forms or patterns of chain-links; and it will readily be seen that my invention, as herein set forth, is capable of being separated into three principal divisions, doing as many distinct classes of work— viz., first, that of trimming or dressing the separable links, as described; second, that of drifting, sizing, or clearing the interior of the hook; and, third, that of coupling the links together into a chain. Each one of these branches of the entire work is distinct and independent of the other two, and may be practiced by severally combining in three separate machines the devices applicable, respectively, to the performance of the three distinctive operations, each machine to be supplied with links by one attendant. While these three machines may not be as economical a method of putting up the entire work as a single machine would be, owing to the extra cost of three machines and three attendants as compared with that of one machine and one attendant, still it is practical, and the same result is accomplished at a greatly-reduced expense as compared with that of hand-labor.

Having now fully described the construction and operation of my invention, what I claim as new, and desire to secure by Letters Patent, is—

1. In a machine for putting together or coupling the links of drive-chains, means for dressing the individual links previous to their being coupled, substantially as shown and described.

2. In a machine for putting together or coupling the links of drive-chains, the combination, with the coupling mechanism, of means for trimming the links previous to coupling, substantially as and for the purpose specified.

3. In a machine for putting together or coupling the links of drive-chains, the combination, with the coupling mechanism, of a drift device for sizing or clearing the hooks of the links previous to coupling, substantially as and for the purpose described.

4. In a machine for putting together or coupling the links of a drive-chain, the combination, with the coupling mechanism, of a trimming device and a drift device, substantially as and for the purpose set forth.

5. The chain channel or guideway, located directly under the feed-chute or link-channel and in the same vertical plane therewith, in combination with a periodically-moved pushing device for intermittently carrying the chain along within said guideway or chain-channel the required distance to bring the hook of the link last coupled directly under the cross-bar of the lowermost link in the channel of the feed-chute, substantially as set forth.

6. The chain channel or guideway, located directly under the feed-chute or link-channel and in the same vertical plane therewith, in combination with a force-bar or coupling device for periodically forcing the lowermost link lengthwise downwardly in said feed-chute into union with the last link in the chain channel or guideway, substantially as set forth.

7. The chain channel or guideway, located directly under the feed-chute or link-channel and in the same vertical plane therewith, in combination with a fulcrum plate or corner, and means for pushing the chain along at proper intervals the required distance to bring the hook of the last coupled link directly under the end bar of the next link to be coupled therewith, substantially as set forth.

8. The chain channel or guideway, located directly under the feed-chute or link-channel and in the same vertical plane therewith, in combination with a fulcrum plate or corner, and means for periodically forcing the lowermost link lengthwise downwardly in said feed-chute or link-guide, into union with the last link in the chain channel or guideway, substantially as set forth.

9. The reciprocating carriage in combination with a link-trimming or drift device, substantially as and for the purpose specified.

10. The combination, with a clamping device for holding the link stationary, of a reciprocating carriage provided with means for drifting the interiors of the hooks of the links, and means for operating the clamping device, substantially as and for the purpose set forth.

11. A feed-chute or link-guide, in combination with a device for arresting the first link introduced in the chute in its downward passage to form a stop for the succeeding links, substantially as and for the purpose set forth.

12. In a machine for putting together or coupling the links of drive-chains, the combination, with means for dressing the links preparatory to coupling, of a clamping device for holding the link stationary while being operated upon, substantially as and for the purpose described.

13. The combination, with a clamping device for holding the link stationary, of a reciprocating carriage provided with means for dressing the link, and means for operating the clamping device, substantially as and for the purpose set forth.

14. The feed-chute, clamping device, and dressing or trimming device, in combination with a device for arresting the first link under clamping device sufficiently far away to allow the dressing or trimming device to pass back and forth, substantially as and for the purpose set forth.

15. In a machine for drifting and trimming drive-chain links preparatory to coupling the same, a feed-chute or link-guide in combination with a check-bar having its free end curved to wedge in between the two end bars of the links to check the descent of the links directly under the clamping device, substantially as set forth.

16 In a machine for putting together or coupling the links of drive-chains, the combination of a feed-chute, a latch device, and a delivery wheel or device for forcing the links down the channel of the chute, substantially as and for the purpose specified.

17. The combination, with a feed-chute and a clamping device, of a feeding device to force the link down the link-channel of the chute to a point under the clamping device, substantially as and for the purpose specified.

18. The combination of a feed-chute, a delivery wheel or device, a push-bar for operating the same, and a pawl, substantially as and for the purpose described.

19. In a machine for putting together or coupling the links of drive-chains, a feed-chute and guideway in the same vertical plane provided at their juncture with a fulcrum-plate, substantially as and for the purpose set forth.

20. In a machine for putting together or coupling the links of drive-chains, a feed-chute in combination with a link-coupling device located above and over the link-channel of the chute, and operating substantially as and for the purpose specified.

21. In a machine for putting together or coupling the links of drive-chains, the combination of a feed-chute, a link-coupling device, and a spring-guide connected to the lower end of the chute, substantially as and for the purpose described.

22. In a machine for putting together or coupling the links of drive-chains, the combination of a feed-chute, a guideway, a link-coupling device, a spring-guide for the links as they turn over, and a thrust-bar to feed the chain along in guideway, substantially as and for the purpose set forth.

23. In a machine for putting together or coupling the links of drive-chains, the combination, with a thrust-bar for shoving the chain along as fast as the links are coupled together, of a variable cam and intermediate connections between it and the bar, by which the latter is operated, substantially as and for the purpose set forth.

NELSON B. FASSETT.

Witnesses:
ALBERT H. ADAMS,
HARRY T. JONES.